Figure 1:
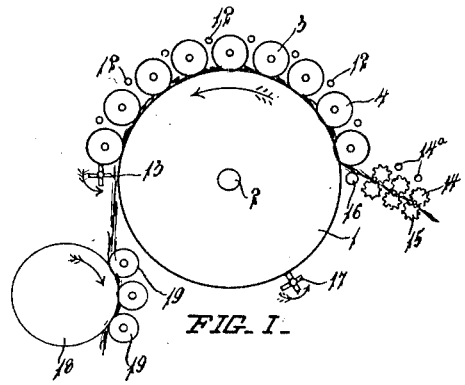

F. V. RAYMOND, W. O. BEERE & J. E. ROUGH.
APPARATUS FOR OBTAINING FIBERS, GUMS, AND JUICES FROM FIBROUS PLANTS.
APPLICATION FILED SEPT. 11, 1912.

1,107,840.

Patented Aug. 18, 1914.

5 SHEETS—SHEET 1.

WITNESSES:
Charles D. Crompton
Fred Pohl

F. V. RAYMOND
W. O. BEERE
J. E. ROUGH
INVENTORS

BY C. Croydon Marks
ATTORNEYS

F. V. RAYMOND, W. O. BEERE & J. E. ROUGH.
APPARATUS FOR OBTAINING FIBERS, GUMS, AND JUICES FROM FIBROUS PLANTS.
APPLICATION FILED SEPT. 11, 1912.
1,107,840. Patented Aug. 18, 1914.
5 SHEETS—SHEET 2.
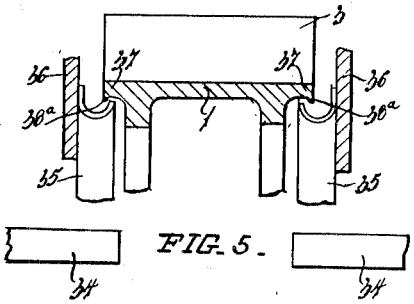
FIG. 5.
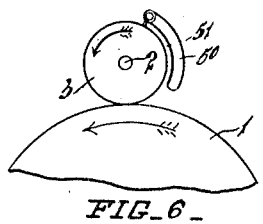
FIG. 6.
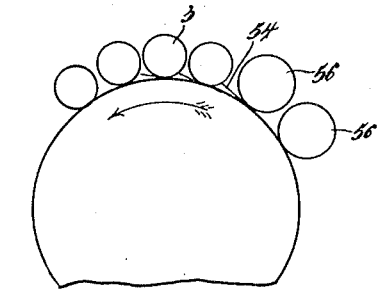
FIG. 8.
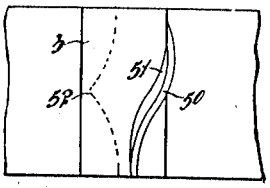
FIG. 7.
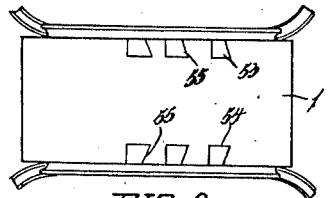
FIG. 9.
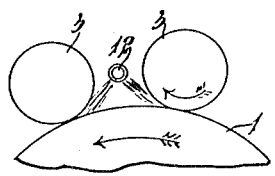
FIG. 10.
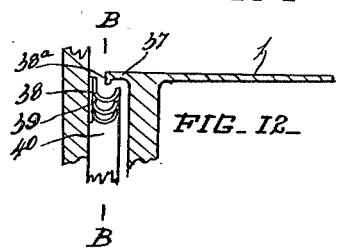
FIG. 12.
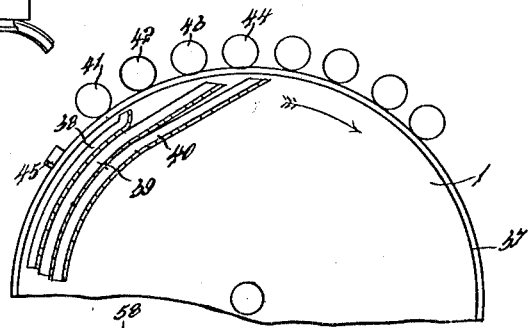
FIG. 11.
FIG. 13.
WITNESSES:
Charles P. Crompton.
Fred Pohl.
F. V. RAYMOND,
W. O. BEERE,
J. E. ROUGH.
INVENTORS
By E. Coggin Marks
ATTORNEY.

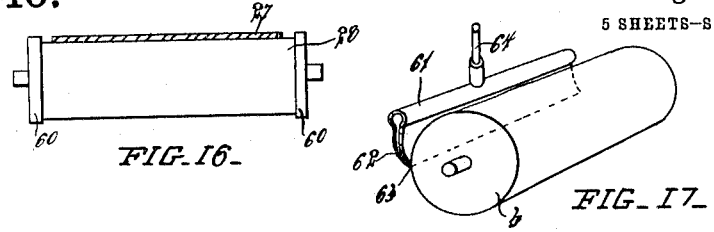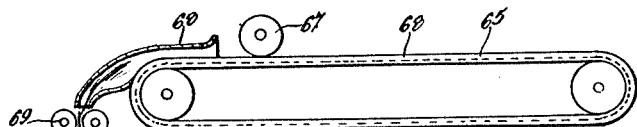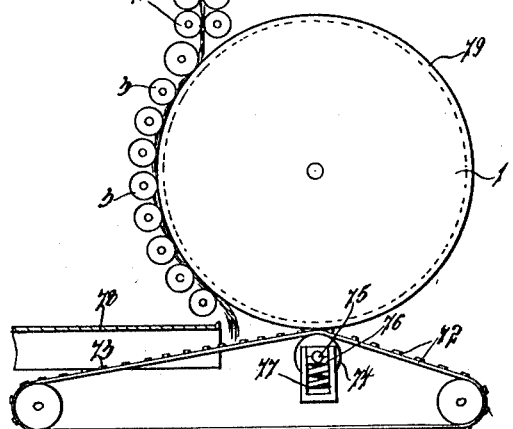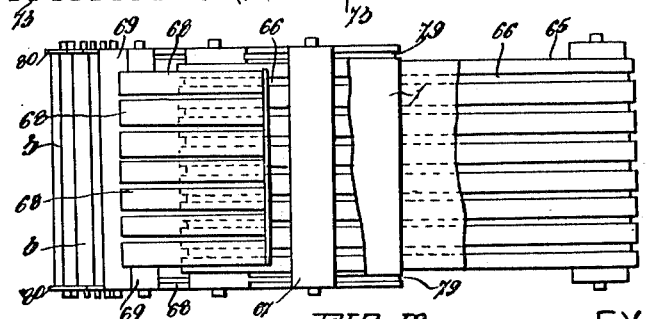

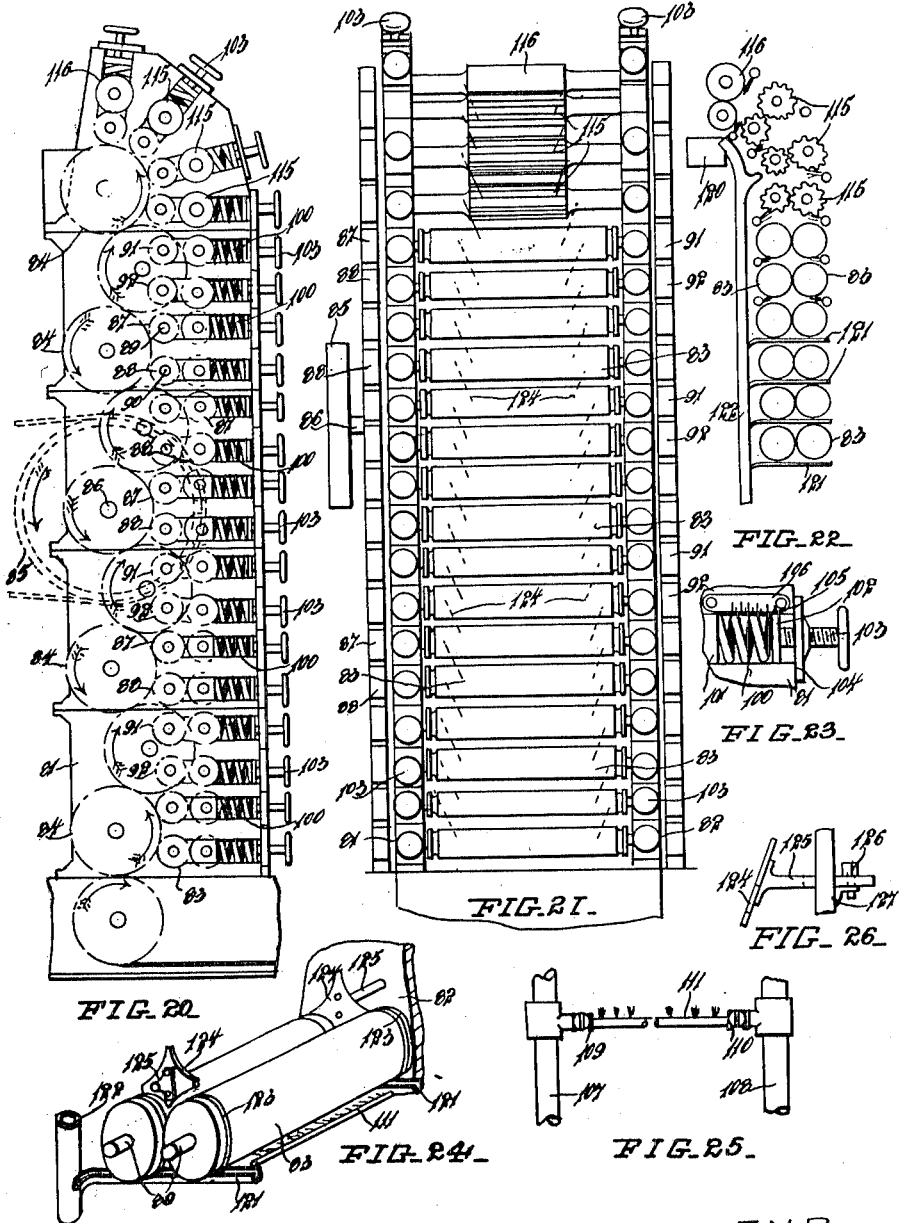

UNITED STATES PATENT OFFICE.

FRANK VICTOR RAYMOND, OF INVERCARGILL, WYNFORD ORMSBY BEERE, OF WELLINGTON, AND JAMES ERNEST ROUGH, OF FOXTON, NEW ZEALAND.

APPARATUS FOR OBTAINING FIBERS, GUMS, AND JUICES FROM FIBROUS PLANTS.

1,107,840.  Specification of Letters Patent.  Patented Aug. 18, 1914.

Application filed September 11, 1912. Serial No. 719,851.

*To all whom it may concern:*

Be it known that we, FRANK VICTOR RAYMOND, WYNFORD ORMSBY BEERE, and JAMES ERNEST ROUGH, all citizens of the Dominion of New Zealand, and residents of Invercargill, Wellington, and Foxton, in the Provincial Districts of Southland, Wellington, and Wellington, respectively, all in the Dominion of New Zealand, have invented certain new and useful Improvements in Apparatus for Obtaining Fibers, Gums, and Juices from Fibrous Plants, of which the following is a specification.

This invention relates to machinery used for obtaining fibers from fibrous plants and provides improved apparatus whereby the fibers are obtained in a better and cheaper manner than heretofore, and the by-products such as gums, and juices of the plants are saved.

According to our invention, the fibers are obtained by squeezing the plant between rollers having hard plain surfaces and the juices are saved by means of belts from which the by-products are obtained by scrapers and caught in conduits or gutters and thence delivered into containers.

In one form of the invention, a revolving main roller or drum operates with a plurality of smaller rollers in contact with the drum. Jets or sprays of water prevent the fiber and by-products adhering to the rollers. The rollers are driven by spur pinions gearing with a spur wheel mounted on the shaft of the drum. The pitch line of the pinions co-incides in diameter with the diameter of the rollers, and the pitch line of the spur wheel with the diameter of the drum. In a modification an endless belt passes between a number of the leading rollers and the drum and around an idle pulley for the purpose of gathering the gums and juices. Another endless belt passes between the last three or four rollers and the drum and around an idle pulley for the purpose of drying the fibers. Scrapers are employed to remove the by-products and the juices from the said belts. Instead of using belts as above described a second drum and rollers are employed and the drum is heated to assist the drying process. Or the belt has an independent set of rollers arranged in pairs, between which the belt passes. A belt for conveying fibrous plants to the rollers is grooved, or provided with parallel pegs or fences, for holding the fibrous plants longitudinally, during delivery to the rollers. A bolt to remove the fiber clinging to the drum has cross battens which rub against the periphery of the drum. In a further modification, the rollers are of equal, or approximately equal, size throughout, and arranged in superposed horizontal pairs. Grooves near the ends of the rollers prevent the water, gum and juices passing over the said ends, gutters and conduits catch the said by-products as they drip from the grooves. Adjustable guides prevent the strands of fiber from spreading too widely apart, and water sprayed tangentially upon rollers prevents the fiber from clinging to the rollers. In all forms of the invention, feed rollers are employed in pairs and convey the fibrous plants to the squeezing rollers, and some of said rollers are corrugated longitudinally, the corrugations gearing together for the purpose of breaking and crushing the cuticle of the plant prior to entering between the squeezing drums and rollers.

The drawings herewith illustrate the invention.

Figure 2:
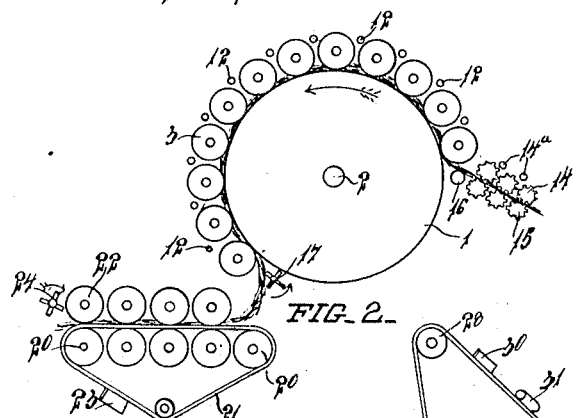
Figure 3:
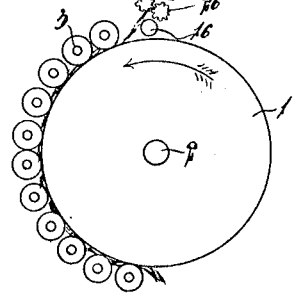
Figure 4:
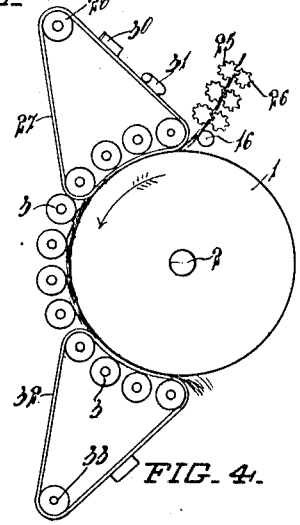
Figure 14:
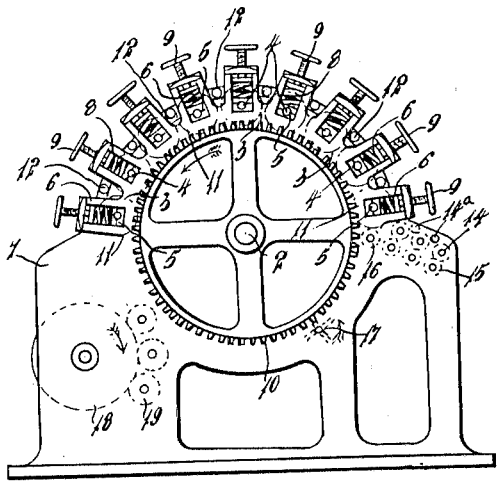
Figure 15:
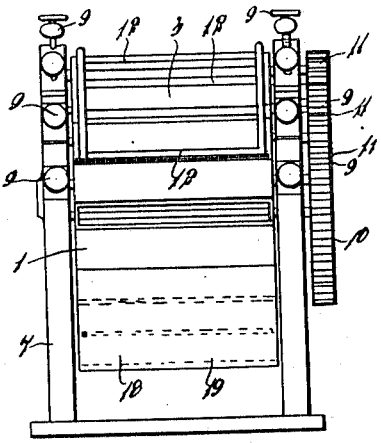

Figure 1, is a diagrammatic side elevation of the form of the invention with a heated drum for drying purposes. Fig. 2, is a diagrammatic side elevation of the form of the invention with a belt for drying purposes. Fig. 3, is a diagrammatic side elevation of the form of the invention with a vertical feed. Fig. 4, is a diagrammatic side elevation of the form of the invention with endless belts for collecting gums and juices, and for drying the fiber. Fig. 5, is a cross section of a drum rim and gutters. Fig. 6, is a diagrammatic side elevation, and Fig. 7, a plan of a scraper upon a roller. Fig. 8, is a diagrammatic side elevation, and Fig. 9, a plan of a drum with edge scrapers and gutters. Fig. 10, is a diagrammatic side elevation of a water spray. Fig. 11, a diagrammatic side elevation, and Fig. 12, a cross sectional elevation embodying gutters for catching gums and juices. Fig. 13, is a front elevation of a grooved roller and cleaning brush. Fig. 14, is a side elevation, and Fig. 15, an end elevation showing a complete machine corresponding to the diagrammatic Fig. 1. Fig. 16, is a front elevation of a pulley. Fig. 17, is an end perspective elevation of a roller and scraper. Fig. 18, is a diagrammatic side elevation, and, Fig. 19, a plan of the form of the invention with a grooved drum and conveying belt, and, Fig. 20, is a side elevation, and Fig. 21, a front elevation of a vertical machine with pairs of rollers of equal diameters throughout. Fig. 22, is a side elevation of rollers, water sprays and conduits. Fig. 23, is a side elevation of a pressure spring and screw. Fig. 24, is a perspective view of a pair of rollers. Fig. 25, is a front elevation of a water spray, and, Fig. 26, is a part elevation showing means for securing guides.

Referring to the drawings the main roller or drum 1 mounted upon shaft 2 has its periphery in contact with rollers 3 mounted upon spindles 4, the bearings 5 of which (see Fig. 14) are slidable in grooves 6 formed in a frame 7. Springs 8 are made to bear upon the bearings 5 with more or less force as required by adjusting the screws 9. The spur wheel 10 fixed to the shaft 2 has its pitch line corresponding in diameter to the diameter of the drum or roller 1. Toothed pinions 11 gearing with the spur wheel 10 have the diameters of their pitch lines corresponding to the diameters of the rollers 3 which are fixed upon spindles 4. Pipes 12 direct jets of water between the rollers 3 to prevent the fiber from clinging thereto, the jets playing upon the rollers at a tangent and in the direction, or approximately in the direction, of the travel of the fiber for the purpose of spreading the fibers and washing out the juices. If it is desired that the fiber should leave the rollers in as dry a state as possible, water is not employed upon the last roller 3 of the series, and the fiber is removed from the said roller by a scraper 13 revolving in the direction shown by the arrow in Fig. 1. Fiber tending to cling to the said roller is scraped off by the scraper 13 and falls vertically.

The blades of fibrous plants are led through pairs of feed rollers 14 and 15 having corrugated peripheries, the corrugations gearing together after the manner of spur wheels. Water is sprayed upon the feed rollers through pipes 14ª. The blades to be treated are passed through the feed rollers 14 and 15 and over the guide roller 16 to the drum 1 and rollers 3. Corrugations of the rollers 14 and 15 bruise and crush the blades in such a manner that when they reach the drum 1 and rollers 3 they do not spread out too widely as they otherwise would do. Blades are carried along between the drum 1 and the rollers 3. As considerable pressure is essential to the treatment of the blades, the springs 8 are necessary, as thereby a constant squeeze can be maintained upon the blades and fiber without causing pulverization of the fiber. Stray strands of fiber clinging to the drum 1 and after leaving the rollers 3, are effectually removed by a second scraper 17. In order to reduce the butts of the blades, and at the same time to obtain therefrom the gums and juices in different classes, least pressure is applied to the roller 3 nearest the feed rollers 14 and 15, and more pressure is applied to the next roller 3, and varying pressures are applied to the remaining rollers in order to squeeze out the remaining gum and juices and to thoroughly treat the fiber.

Fig. 1 shows a heated drum 18 in combination with rollers 19. Fiber falling upon the drum 1 and rollers 3 passes between, and is squeezed by, the drum 18 and rollers 19 and is thoroughly dried during its passage between them. The drum 18 and the rollers 19 are heated by gas, steam or other convenient means not shown on the drawing.

In Fig. 2 alternative means are shown for drying the fiber after it leaves the drum 1 and rollers 3, and comprise rollers 20 around which pass an endless belt 21. Rollers 22 arranged vertically form pairs with the rollers 20 and are pressed upon the belt 21. The fiber falls upon the belt 21 and is carried between rollers 22 and the belt 21. Moisture squeezed out of the fiber clings to the belt and rollers 22 from which it is scraped by scrapers 23 and 24 respectively.

Referring now to Fig. 3 the feed rollers 25 and 26 are situated vertically above the shaft 2, or at any point between a position horizontal to the axis of the drum on the feeding side and a position at, or nearly vertical above the shaft 2 as just described.

In Fig. 4 the first three or four of the rollers 3 form a set or series, and are provided with an endless belt 27 which passes between said rollers and the drum 1. The belt is kept taut by a tightening pulley 28. The gum and juices squeezed out of the blades are caught upon the belt 27 and scraped off by a sloping or diagonal scraper 30, or by means of a rubber roller or rollers 31 placed diagonally across the belt. The last three or four of the rollers 3 form another set or series, and are provided with an endless belt 32, and water is not fed to these rollers. The fiber is made drier by squeezing between the belt 32 and the drum 1. Moisture extracted from the fiber is removed from the belt by a scraper 33.

Fig. 5 shows receptacles 34 into which flow gum and juices from the drum 1. Conduits or gutters 35, fixed to the frame 36 of the machine and U shaped in cross section, extend under the rims 37 upon each side of the drum drip beads 38ª being provided on the inside of said rims. To prevent the gum and juices from passing down the face or spokes of the drum 1, the conduits or gutters are curved to correspond to the interior circumferential curve of the rims 37. Gum and juices dripping from the drum are caught in the conduits which discharge into receptacles 34.

Figs. 11 and 12 show superposed conduits 38, 39 and 40 which are employed on each side of the drum. The terminations of the conduits 38 occurring immediately above the point of contact of the roller 41 with the drum, the terminations of the conduits 39 above the points of contact of the rollers 42 and 43, and the terminations of the conduits 40 above the point of contact of the roller 44. Gums and juices squeezed out by the roller 41 pass away by the conduits 38, a V shaped scraper 45 being employed to direct the juices to the conduits. Juices squeezed out by the rollers 42 and 43 are caught in the conduits 39, and juices squeezed out by the roller 44 are caught in the conduits 40.

Figs. 6 and 7 show cleaning appliances for the roller 3, a back or stock 50 is shaped to correspond to the shape of the roller 3 and a rubber web or plate 51 held in the said back 50 is shaped to fit upon the said roller. Gums and juices collected on the roller are removed by the scraper. The dotted lines in Fig. 7 show another shape which the scraper 50 may have. The back and rubber web are shaped with an apex 52 the scraper having a V formation with the rubber fitting against the roller. In this case the gum and juices are carried to each side of the drum.

Figs. 8 and 9 show scraping appliances 53 and 54 between the rollers 3. These scrapers consist of plates having knife edges 55 bearing upon the edges of the drum 1 and disposed diagonally as shown for carrying off water, gum and juices from the drum. Rollers 56 in Fig. 8 are of increased diameter to facilitate the entrance of the blades. It has been found that a leading roller of small diameter tends to cause the blades to bunch up or accumulate in front of the roller, but by increasing the diameter of the leading roller an easy rolling motion over the blades is obtained and no bunching up occurs.

Fig. 13 shows a roller for use as a leading roller 3, its surface having circumferential grooves 57 for splitting the blades as they enter the machine and for preventing the blades from slipping sidewise. A brush 58 bears upon the roller and keeps it clean. The guide rollers such as 28 and 33 have flanges 60 to guide their belts, (see Fig. 16).

Fig. 17 shows a form of scraper combined with a water spray to prevent fiber adhering to the rollers 3, and to remove the fiber, which the water has failed to remove. This scraper and water spray consist of a plate 61 having a knife edge 62 bearing upon the roller, and the plate is bent back and forms a channel 63 with a narrow mouth, which delivers water from a pipe 64 to the roller 3 immediately below the knife edge 62. Any fiber not removed by the water is scraped off by the knife edge 62.

Referring now to Figs. 18 and 19 the blades to be treated are placed upon a conveying belt 65 having longitudinal grooves 66, or rows of projecting pegs forming fences or the like means, whereby blades are retained longitudinally upon the belt and at fixed distances apart. The roller or rollers 67 are used above the belt 65 and press upon and keep the blades within the said grooves, and mouthpieces 68 at the end of the conveying belt receive and guide the blades to pairs of feed rollers 69, the surfaces of which are plain to squeeze the gum from the blades. The spacing apart of the mouthpieces corresponds to the spacing of the grooves 66. Other pairs of feed rollers 70 arranged vertically below the rollers 69 have corrugated surfaces, which bruise the blades and crush the cuticle for the purpose of preventing the blades spreading while passing through the rollers. These corrugated feed rollers may vary in speed. The remaining pairs of feed rollers 71 have plain surfaces and are used for obtaining the juices. The fiber from the drum 1 falls upon a conveyer, comprising a belt 72 provided with transverse ribs 73 of leather, wood, metal or the like, and passes over a guide pulley 74, which brings the ribs 73 into contact with the periphery of the drum 1. The guide pulley 74 has its spindle 75 mounted in bearings 76, which are supported upon springs 77. The ribs 73 remove fiber adhering to the drum, and a plate 78 forms a curved cover over the conveyer to prevent water from the drum and rollers dripping on to the conveyer. In a modification the fiber does not pass directly to the conveyer, but is fed to a drum and rollers corresponding to the drum 18 and rollers 19 shown in Fig. 1. The fibers are dried by the drum 18 and rollers 19, which are heated for this purpose.

The drum 1 is made with circumferential grooves 79 near each side, the said grooves catching the gum and juices, which run down the grooves into receptacles. In a modification the rollers 3 have flanges 80 at their ends, and gutters or the like catch gum and juices dripping from the rollers and flanges.

The drums and rollers are made of a metal or material which has sufficient hardness to squeeze out the fiber, but of such a nature as shall not oxidize the fiber, such substances are steel, plated with nickel or the like, glass, earthenware, vulcanite, stone or the like substances. The water sprayed upon the rollers is preferably used hot to facilitate the treatment of the blades.

Figs. 20, 21, 22 and 23 show a further modification of the invention where the drum 1 is replaced by rollers with plain surfaces, and these form a continuation of the feed rollers previously described. This machine has frames 81 and 82 made up of a number of superposed sections for convenience of construction. A plurality of superposed pairs of main rollers 83 arranged horizontally are mounted in the frames. These rollers have hard plain surfaces that is to say they are not ribbed, corrugated or roughened in any manner, and may be made of diameters which gradually decrease so that the circumferential speed of the lower rollers is slower than the speed of the upper rollers. By this means the strain exerted on the fiber when all the rollers have the same diameter is overcome. The rollers 83 are driven by means of spur wheels 84 gearing one with the other and operated by a pulley 85 mounted upon the axle 86 of the middle spur wheel, or the pulley may be mounted on a countershaft having a spur pinion gearing with the middle spur wheel. Each of these spur wheels 84 gears with spur pinions 87 and 88 mounted upon spindles 89 and 90 of two superposed rollers, and the rollers opposed thereto are driven by spur pinions 91 and 92 upon the other ends of the roller spindles. Pressure is applied to both ends of the rollers 83 by means of springs 100, (see Fig. 23) which bear at one end against the bearings 101 of the roller, caps or plates 102 being pressed against the other ends of the springs by means of screws 103 threaded through plates 104 fixed to the frames 81 and 82. Arrows marked on the caps or points 105 projecting therefrom indicate on scales 106 the amount of pressure applied to the springs 100. The pressure applied to the rollers 83 is gradually increased, the top pair of rollers receiving least pressure and the lowermost rollers greatest pressure or the pressure is increased for a certain number of pairs of rollers and then the pressure is gradually decreased or kept constant or varied as required. To remove rollers 83 the screw 103 at each end thereof is slackened, the plates 104 removed and the springs 100 withdrawn from the frame, leaving the rollers free to be removed. Water is fed to each roller 83 and at a tangent thereto, with the exception of the lowermost pair of rollers which have no such feed water. Stand pipes 107 and 108 (see Fig. 25) extending up the machine have stop cocks 109 and 110 branch pipes 111 which extend along the rollers 83 and have perforations which direct the water at an angle tangential to the rollers. As previously stated so in this case the water is preferably used hot, the heating of the rollers by the water assisting the treatment. By this means fiber in treatment having a tendency to cling to the rollers is prevented from so clinging and is directed to the next lower pair of rollers. We find that the best way to apply water is to direct the jets into the machine at an angle tangential to the lower surfaces of the rollers. The water not only prevents the fiber from clinging to the rollers but also washes away vegetable matter removed from the fiber by the rollers. Above the plain main rollers 83 is a plurality of pairs of breaking rollers 115 and a pair of squeezing rollers 116. These squeezing rollers have plain surfaces and only sufficient pressure is applied to them to express the gum out of the butts of the blades. If the squeezing rollers are made to rotate slightly slower than the breaking rollers 115 a pull is exerted on the blades which is beneficial. From the squeezing rollers 116 the blades pass to the rollers 115 which have geared corrugations. The rollers 115 are arranged in a curve formation in order to lead the blades from a horizontal conveyer, such as shown in Fig. 20, to the vertically arranged pairs of rollers 83. The corrugations of one pair of breaking rollers 115 vary in size from the corrugations of the other pairs of breaking rollers so that in operation the blades are uniformly crushed by the said corrugations. The corrugated rollers 115 have comparatively little pressure exerted upon them. Water is supplied to the squeezing and breaking rollers, and the gum expressed from the blades by the rollers 116 is caught in a tank 120, and the juices expressed by the rollers 115 and 83 and the water sprayed by the pipes 111, are caught in channels 121, (see Fig. 24) leading from the rollers to the conduit 122. As the moisture expressed by the rollers does not pass between the same but flows to the ends thereof, grooves 123 are provided at the ends of the rollers and the channels 121 are located below these grooves, which construction prevents the moisture from running over the ends of the rollers and into the bearings 101. As individual fibers have a tendency to stray over the ends of the rollers we provide guides 124 which prevent the fibers from so passing over the ends of the rollers. These guides are conveniently made of cast metal and with their faces converging toward the bottom. They are mounted upon bars 125 passing through square holes in the frames 81 and 82 and held by screws 126, (see Fig. 26), passing through slots in the bars and screwing into brackets 127 fixed to the frames. The guides are adjusted laterally by sliding the bars 125 in or out as required. Rotating or other scrapers or beaters are employed as previously described to scrape off fiber tending to cling to the last pair of rollers, upon which water is not sprayed. A traveling belt 128 is employed for conveying the fiber away and if desired to a drying chamber.

Blades treated as above described yield fiber ready for market without any further treatment. Microscopic examination of the fiber so treated shows that the casing of each individual fiber is crushed and thus sets free the "fine fibers contained in said casing. These fine fibers when freed from their casing are a much more valuable product than when contained in their casing.

What we do claim and desire to secure by Letters Patent of the United States is:—

1. Apparatus of the kind described, comprising a plain drum, a spur wheel fixed to the spindle of the said drum, a series of spaced plain rollers pressed against the periphery of the said drum, pinions fixed to the spindles of the rollers and gearing with said spur wheel so that fibrous blades will be carried through the machine between the drum and the rollers, and pipes located between the rollers of said series, each of said pipes being adapted to deliver a separate spray to two of said rollers substantially as set forth.

2. Apparatus of the kind described, comprising a plain drum, a plurality of conduits for receiving and conducting away the expressed juices and gums therefrom, and a series of plain rollers pressed against the periphery of said drum, the leading roller having least pressure, the next roller having increased pressure, and thereafter varying pressures being applied to the said rollers, as set forth.

3. In apparatus as described, the combination of a drum, a plurality of contacting rollers, superposed conduits fixed to the frame of the machine and extending under the rim upon each side of the drum, the said conduits terminating successively in front of the leading and the following rollers, and receptacles into which the conduits respectively discharge, as set forth.

4. In a device of the type described, a drum, a plurality of rollers contacting the drum, scraping appliances between said rollers and means integral with said scraping devices for delivering a spray of water to said rollers.

5. In apparatus as described, the combination of a drum, a plurality of contacting rollers, a forked water spray, part of which plays upon one roller to remove fiber adhering thereto, and the other part of which plays upon another roller in the direction tending to assist the travel of the fiber through the machine, and conduits for conducting away the expressed juices and gums, as set forth.

6. In apparatus of the kind described, a combined scraper and water spray consisting of a plate having a knife edge bearing upon a roller, the said plate being bent back to form a channel with a narrow mouth below the knife edge and a pipe delivering water into the said channel, substantially as set forth.

In testimony whereof we have signed our names to this specification in the presence of two witnesses.

FRANK VICTOR RAYMOND.
WYNFORD ORMSBY BEERE.
JAMES ERNEST ROUGH.

Witnesses:
ERNEST SMITH BALDWIN,
HENRY ASHTON HIGHET.